(12) United States Patent
Davydov et al.

(10) Patent No.: US 10,367,551 B2
(45) Date of Patent: Jul. 30, 2019

(54) PRECODING RESOURCE BLOCK GROUP BUNDLING ENHANCEMENT FOR FULL DIMENSION MULTI-IN-MULTI-OUTPUT

(71) Applicant: Intel Corporation, Santa Clara, CA (US)

(72) Inventors: Alexei Davydov, Niz (RU); Yuan Zhu, Beijing (CN); Gregory V. Morozov, Niz (RU)

(73) Assignee: INTEL CORPORATION, Santa Clara, CA (US)

( * ) Notice: Subject to any disclaimer, the term of this patent is extended or adjusted under 35 U.S.C. 154(b) by 265 days.

(21) Appl. No.: 14/820,879

(22) Filed: Aug. 7, 2015

(65) Prior Publication Data

US 2016/0227520 A1    Aug. 4, 2016

Related U.S. Application Data

(60) Provisional application No. 62/109,198, filed on Jan. 29, 2015.

(51) Int. Cl.
*H04B 7/06* (2006.01)
*H04L 5/00* (2006.01)
*H04B 7/0456* (2017.01)

(52) U.S. Cl.
CPC ............ *H04B 7/0456* (2013.01); *H04L 5/00* (2013.01); *H04B 7/0619* (2013.01)

(58) Field of Classification Search
None
See application file for complete search history.

(56) References Cited

U.S. PATENT DOCUMENTS

| | | | |
|---|---|---|---|
| 2008/0192856 A1* | 8/2008 | Jongren | H04B 7/0617 375/267 |
| 2012/0099544 A1* | 4/2012 | Pajukoski | H04L 5/0032 370/329 |
| 2012/0275530 A1* | 11/2012 | Nazar | H04B 7/022 375/267 |
| 2012/0320782 A1* | 12/2012 | Seo | H04L 1/1854 370/252 |
| 2013/0128852 A1* | 5/2013 | Xue | H04W 72/04 370/329 |
| 2013/0163530 A1* | 6/2013 | Chen | H04W 72/04 370/329 |
| 2013/0176952 A1* | 7/2013 | Shin | H04L 5/001 370/329 |

(Continued)

OTHER PUBLICATIONS

Samsung, "Support of High Order Multi-User Spatial Multiplexing for FD-MIMO," 3GPP TSG RAN WG1 #79, R1-144754, Agenda item: 6.3.3.3, Nov. 17-21, 2014, San Francisco, USA, 4 pages.

(Continued)

*Primary Examiner* — Ayaz R Sheikh
*Assistant Examiner* — Tarell A Hampton
(74) *Attorney, Agent, or Firm* — Schwabe, Williamson & Wyatt, P.C.

(57) ABSTRACT

A method comprises configuring a transmission mode for a user equipment (UE) based on user equipment specific reference signals (UE-RS) and configuring one or more precoding resource groups; and providing a dynamic indication to indicate which precoding resource group is valid for a physical downlink shared channel.

16 Claims, 7 Drawing Sheets

(56) References Cited

U.S. PATENT DOCUMENTS

| | | | | |
|---|---|---|---|---|
| 2013/0336135 | A1* | 12/2013 | Lindoff | H04B 7/0417 |
| | | | | 370/252 |
| 2014/0064235 | A1* | 3/2014 | Seo | H04L 5/0048 |
| | | | | 370/329 |
| 2014/0086285 | A1* | 3/2014 | Yang | H04B 7/0691 |
| | | | | 375/219 |
| 2014/0314007 | A1* | 10/2014 | Chen | H04B 7/00 |
| | | | | 370/329 |
| 2014/0328302 | A1* | 11/2014 | Park | H04L 5/0037 |
| | | | | 370/329 |
| 2014/0348012 | A1* | 11/2014 | Wu | H04W 24/08 |
| | | | | 370/252 |
| 2015/0016348 | A1* | 1/2015 | Cimpu | H04W 72/082 |
| | | | | 370/329 |
| 2015/0078271 | A1* | 3/2015 | Kim | H04B 7/0417 |
| | | | | 370/329 |
| 2015/0098411 | A1* | 4/2015 | Jongren | H04L 5/0073 |
| | | | | 370/329 |
| 2015/0146658 | A1* | 5/2015 | Liu | H04L 5/0053 |
| | | | | 370/329 |

OTHER PUBLICATIONS

3GPP, "Technical Specification Group Radio Access Network; Evolved Universal Terrestrial Radio Access (E-UTRA); Physical layer procedures (Release 12)," 3GPP TS 36.213 V12.7.0 (Sep. 2015), Sep. 25, 2015, 167 pages.

LG Electronics, "Discussion on RS design enhancements," 3GPP TSG RAN WG1 Meeting #79, R1-144912, Agenda item: 6.3.3.3, Nov. 17-21, 2014, San Francisco, USA, 8 pages.

\* cited by examiner

PRECODING RESOURCE BLOCK GROUP BUNDLING ENHANCEMENT FOR FULL DIMENSION MULTI-IN-MULTI-OUTPUT

CLAIM OF PRIORITY

Priority of U.S. Provisional patent application Ser. No. 62/109,198, filed Jan. 29, 2015, is claimed and is hereby incorporated by reference.

BACKGROUND

Wireless mobile communication technology uses various standards and protocols to transmit data between a base transceiver station (BTS) and a wireless mobile device. In the third generation partnership project (3GPP) long term evolution (LTE) systems, the BTS may be an evolved Node Bs (eNode Bs or eNBs) that may communicate with the wireless mobile device, known as a user equipment (UE).

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Figure 1:
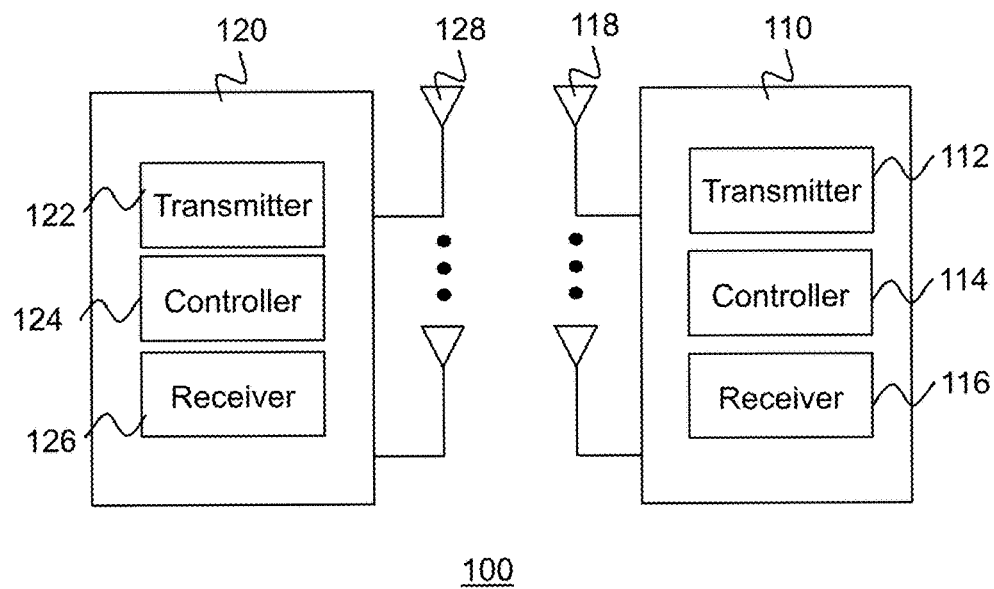
FIG. 1 schematically illustrates a high-level example of a network system comprising a UE and an eNB, in accordance with various embodiments.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices. For another example, a transitory machine-readable medium may include electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting. As used herein, the term "module" and/or "unit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

In 3GPP radio access network (RAN) LTE systems, the transmission station may be an Evolved Universal Terrestrial Radio Access Network (E-UTRAN) Node Bs (also commonly denoted as evolved Node Bs, enhanced Node Bs, eNodeBs, or eNBs), which may communicate with a wireless mobile device, known as a user equipment (UE). A downlink (DL) transmission may be a communication from the transmission station (or eNodeB) to the wireless mobile device (or UE), and an uplink (UL) transmission may be a communication from the wireless mobile device to the transmission station.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, 4.5G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMax cellular network, and the like.

FIG. 1 schematically illustrates a wireless communication network 100 in accordance with various embodiments. Wireless communication network 100 (hereinafter "network 100") may be an access network of a 3GPP LTE network such as evolved universal terrestrial radio access network (E-UTRAN). The network 100 may include a base station, e.g., eNB 110 that may wirelessly communicate with a mobile wireless device, e.g., UE 120.

In one embodiment, the eNB 110 may include one or more antennas 118, one or more radio modules or units (not shown) to modulate and/or demodulate signals transmitted or received on an air interface, and one or more digital modules or units (not shown) to process signals transmitted and received on the air interface. As shown in FIG. 1, the eNB 120 may include a controller 114. The controller 114 may be coupled with a transmitter 112 and a receiver 116 and/or one or more communications modules or units in eNB 120. The transmitter 112 and/or the receiver 116 may be further coupled with one or more antennas 118 of the eNB 110 to communicate wirelessly with other components of the network 100, e.g., UE 120.

In one embodiment, the UE 120 may comprise a transmitter 122 and a receiver 126 and/or one or more communications modules or units. The transmitter 122 and/or the receiver 126 may be further coupled with one or more antennas 128 of the UE 120 to communicate wirelessly with one or more components of the network 100, e.g., a base station (BS), an evolved Node B (eNB), e.g., the eNB 110, or other type of wireless wide area network (WWAN) access point. For example, UE 120 may be a subscriber station that is configured to concurrently utilize radio resources across multiple carriers such as in a carrier aggregation scheme using protocols compatible with the 3GPP standards including, for example, Long Term Evolution (LTE) including LTE Advanced or variants thereof. In various embodiments, the UE 120 may further comprise one or more radio modules or units (not shown) to modulate and/or demodulate signals transmitted or received on an air interface, and one or more digital modules or units (not shown) to process signals transmitted and received on the air interface. The mobile device may include one or more antennas configured to communicate with.

In various embodiments, eNB 110 and/or UE 120 may support multiple-input and multiple-output (MIMO) communication with each other. For example, eNB 110 and/or UE 120 may comprise one or more antennas to utilize one or more radio resources of the wireless communication network 100. The UEs may communicate using Orthogonal Frequency Division Multiple Access (OFDMA) (e.g., in the downlink) and/or Single-Carrier Frequency Division Multiple Access (SC-FDMA) (e.g., in the uplink) in some embodiments.

In various embodiments, examples of UE 120 may comprise a mobile device such as, but not limited to, a laptop computing device, a tablet computing device, a netbook, a smartphone, a wearable device, a mobile station (MS), a mobile wireless device, a mobile communication device, a smartphone, a tablet, a handset, a cellular phone, a mobile phone, a personal computer (PC), a notebook, an ultra mobile PC (UMPC), a handheld mobile device, an universal integrated circuit card (UICC), a personal digital assistant (PDA), a Customer Premise Equipment (CPE), or other consumer electronics such as MP3 players, digital cameras and the like, personal computing accessories and existing and future arising wireless mobile devices which may be related in nature and to which the principles of the embodiments could be suitably applied.

In various embodiments, the UE 120 may communicate using one or more wireless communication standards including Third Generation Partnership Project Long Term Evolution (3GPP LTE), Worldwide interoperability for Microwave Access (WiMAX), High Speed Packet Access (HSPA), Bluetooth, WiFi, or other wireless standards. The UE 120 may communicate using separate antennas for each wireless communication standard or shared antennas for multiple wireless communication standards. The UE 120 may communicate in a wireless local area network (WLAN), a wireless personal area network (WPAN), and/or a wireless wide area network (WWAN).

In one embodiment, eNB 110 may transmit data to the UE 120 on a physical downlink shared channel (PDSCH). The communication of data on the PDSCH may be controlled via a control channel, referred to as a physical downlink control channel (PDCCH). The PDCCH may be used for downlink (DL) and uplink (UL) resource assignments, transmit power commands, and paging indicators. The downlink PDSCH scheduling grant may be designated to a particular UE for dedicated PDSCH resource allocation to carry UE-specific traffic, or it may be designated to all UEs in the cell for common PDSCH resource allocation to carry broadcast control information such as system information or paging.

The data carried on PDCCH may be referred to as downlink control information (DCI). There may be several formats that are defined for a DCI message. The physical downlink control channel (PDCCH) may be used to transmit downlink control information (DCI) that may transport resource allocations or scheduling related to downlink resource assignments on the PDSCH, uplink resource grants, and/or uplink power control commands or other control information. For example, Format 0 may be used for scheduling of physical uplink shared channel (PUSCH). Format 1 may be used for scheduling of a PDSCH codeword in a cell. Format 1A may be used to for compact scheduling of a PDSCH codeword in a cell and random access procedure. Format 1B may be used for compact scheduling of a PDSCH codeword in a cell with precoding information. Format 1C may be used for very compact scheduling of a PDSCH codeword. Format 1D may be used for compact scheduling of a PDSCH codeword in a cell with precoding and power offset information. Further, a DCI format may further comprise Format 2/2A/2B/2C/2D for transmission of control information such as PDSCH related allocation and Format 3/3A for transmission of a transmission power control (TPC) command for an uplink channel.

This list may not intend to be complete. Additional formats may also be used. As the complexity of wireless networks increases, such as the use of HetNets having multiple different types of nodes, other formats may be created to carry the desired downlink control information.

Figure 2:
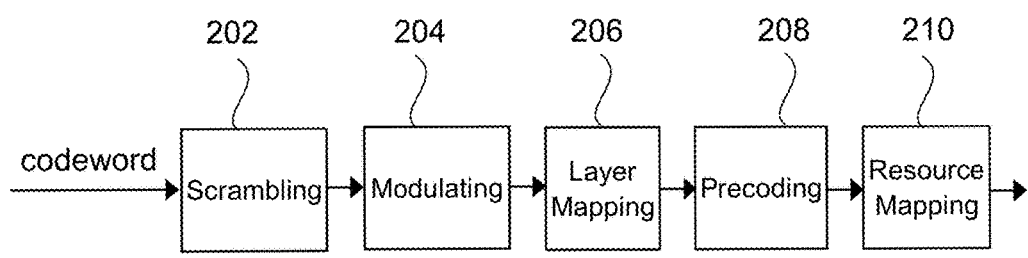
FIG. 2 illustrates a schematic structure of a downlink physical channel in accordance with an example.

FIG. 2 schematically illustrates a structure of a downlink physical channel. In one embodiment, a signal that represents the downlink physical channel may be coded, e.g., by a coder, to generate coded bits. Some coding process may be outlined in the 3GPP LTE specification. The coded bits for the physical channel may be multiplexed to generate a block of data, e.g., in a codeword. In some embodiments, the size of the block of data may match the amount of resource elements that can be used by the physical channel. As shown in FIG. 2, a scrambling module or scrambler may scramble 202 the coded bits in the codeword to be transmitted on the physical channel. The scrambled bits may undergo modulation (204), e.g., by a modulating module or modulator. For example, Quadrature Phase Shift Keying (QPSK) may be used to create complex-valued modulation symbols. In other embodiments, other types of modulation, such as Bi-Phase Shift Keying (BPSK), 16 Quadrature Amplitude Modulation (16-QAM), 32-QAM, 64-QAM, 256-QAM, and so forth may be used.

The complex symbols may be mapped (206), e.g., by a layer mapping module or layer mapper, to one or more transmission layers, e.g., depending on a number of transmission antenna ports used at an eNode B. A precoding module or precoder may precode (208) the complex-valued modulation symbols on each layer to generate an output for transmission on corresponding antenna ports. For example, precoding for transmission diversity may be performed for two or four antennas in legacy systems based on the 3GPP LTE Rel. 8 specification or more complex systems such as an eNode B with eight antennas. The complex valued modulation symbols for each antenna may be mapped (210) to resource elements, e.g., by a resource mapping module or resource mapper. In some embodiments, time-domain (orthogonal frequency-division multiplexing (OFDM) signal for each antenna port may be generated from the resource mapped complex-valued symbols. The time-domain OFDM signal may be sent to corresponding antenna port of the eNB for transmission.

Figure 3:
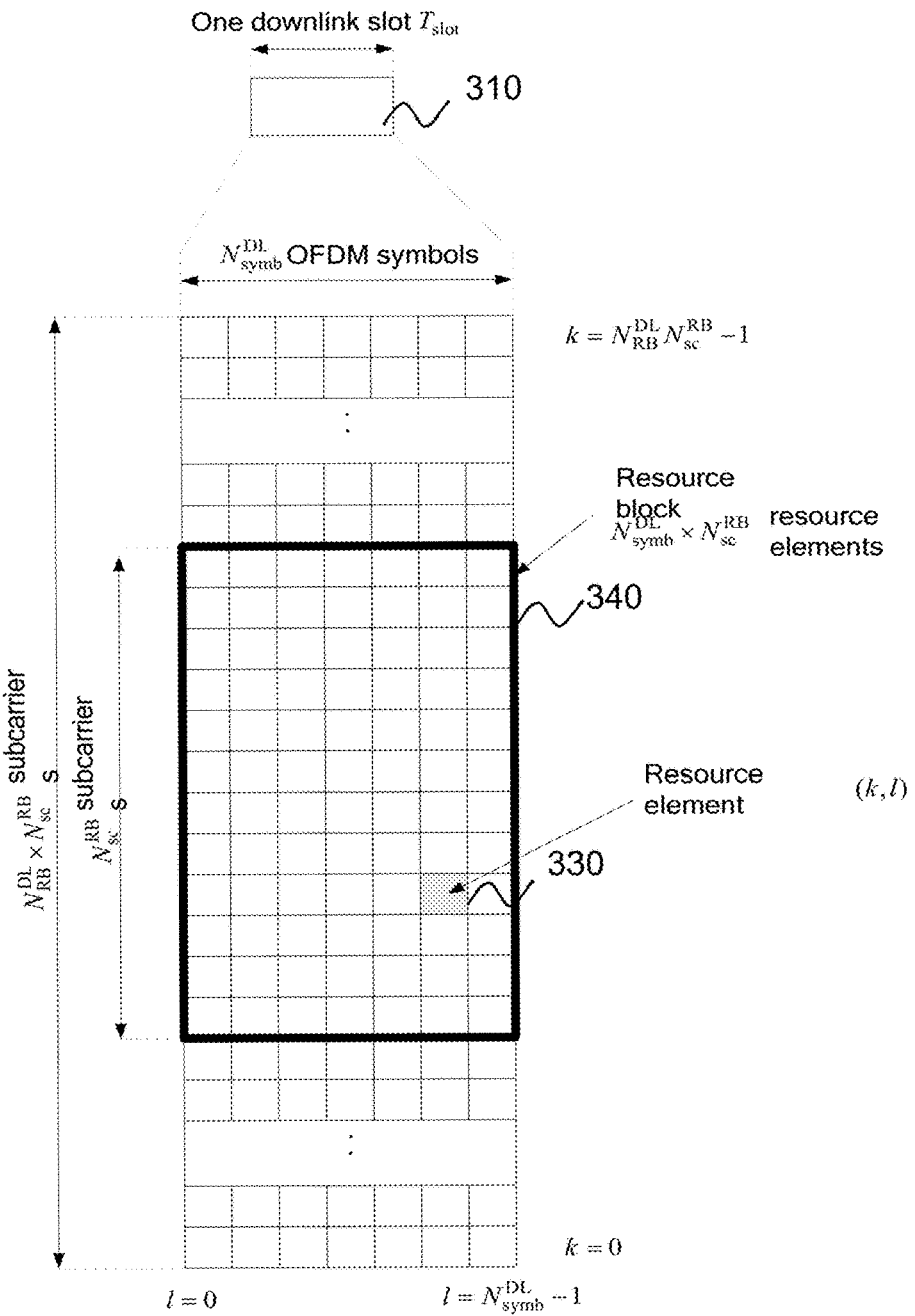
FIG. 3 illustrates a diagram of a downlink resource grid according to an embodiment.

FIG. 3 illustrates a diagram of a downlink resource grid structure according to an embodiment. A radio frame may have a duration $T_f$, of, e.g., 10 milliseconds (ms). Each radio frame may be segmented or divided into one or more subframes that are each 1 ms long. Each subframe may be further subdivided into two slots, each with a duration, $T_{slot}$, of 0.5 ms. For example, FIG. 3 illustrates a slot 310 with a duration of $T_{slot}$ for a downlink channel. The downlink slot 310 may contains a number $N_{symb}^{DL}$ of OFDM symbols.

A resource element (RE) 330 may be the smallest identifiable unit of transmission. The resource element 330 may be identified by the index pair (k, l) in a slot, where k=0, . . . , $N_{RB}^{DL} N_{sc}^{RB}$−1 and l=0, . . . , $N_{symb}^{DL}$−1 are the indices in the frequency and time domains, respectively. Transmissions may be scheduled in larger units such as resource blocks (RBs) 340 that may comprise a number $N_{sc}^{RB}$ of adjacent subcarriers for a period of, e.g., a 0.5 ms timeslot. Resource block 340 may be used to describe the mapping of a physical channel to resource elements. For example, a physical resource block 340 may be defined as $N_{symb}^{DL}$ consecutive OFDM symbols in time domain and $N_{sc}^{RB}$ subcarriers in frequency domain. A physical resource block (RB) 340 may consist of $N_{symb}^{DL} \times N_{sc}^{RB}$ resource elements that may correspond to one slot in the time domain and, e.g., 180 kHz in the frequency domain.

In one embodiment, an RB 340 may include, e.g., 12-15 kHz subcarriers and, e.g., 7 OFDM symbols per subcarrier, e.g., for short or normal cyclic prefix. In another embodiment, an RB 340 may use six OFDM symbols if an extended cyclic prefix is used. In some embodiments, an RB may comprise a different number of one or more OFDM symbols. The resource block 340 may be mapped to 84 resource elements (REs) 330 using short or normal cyclic prefixing, or the resource block may be mapped to 72 REs (not shown) using extended cyclic prefixing. The RE may be a unit of one OFDM symbol by one subcarrier (e.g., 15 kHz). The RE 330 may transmit two bits of information using QPSK. In some embodiments, the number of bits communicated per RE may be dependent on the level of modulation.

Figure 4:
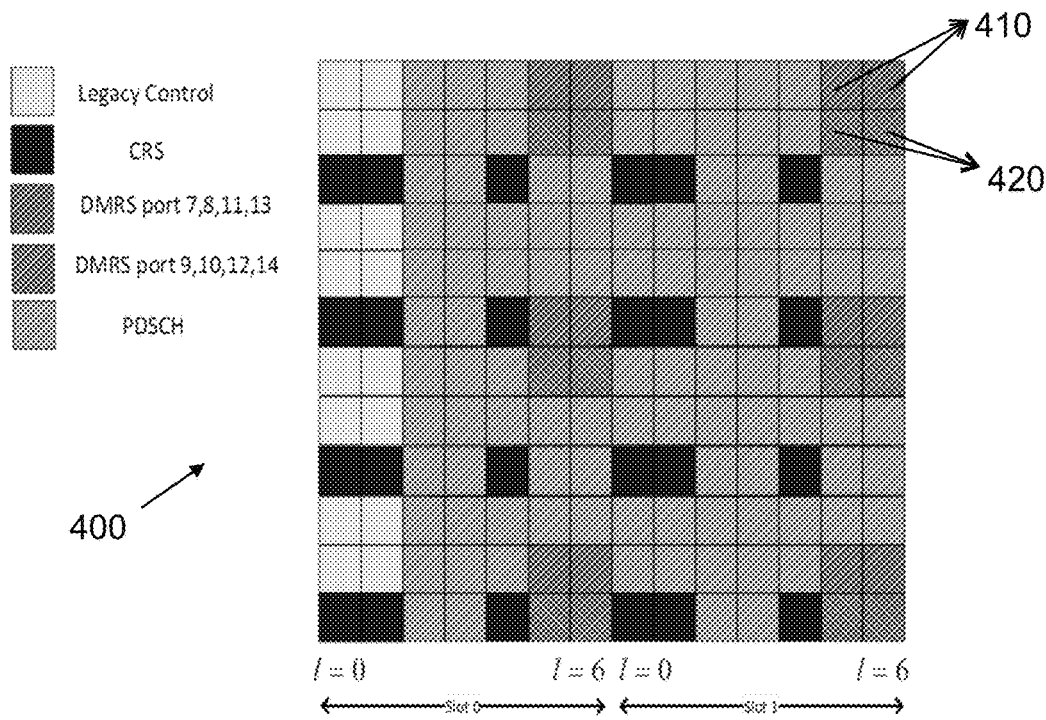
FIG. 4 illustrates a mapping of a demodulation reference signal and antenna ports according to an embodiment.

FIG. 4 illustrates a mapping of a demodulation reference signal (DM-RS) or a UE specific reference signal (UE-RS) to antenna ports according to an embodiment. In 3GPP LTE specifications, some designs for a demodulation reference signal are described. In 3GPP LTE Rel-9, dual layer beamforming based transmission mode 8 (TM 8) is introduced. In TM 8, a UE may perform channel estimation based on DM-RS or UE-RS to demodulate the received PDSCH. In one embodiment, a transmission on a DM-RS antenna port or a UE-RS antenna port may be precoded via the same precoder as its associated PDSCH layer. For Multi-User Multi-Input-Multi-Output (MU-MIMO), transparent MU-MIMO may be supported because DM-RS or UE-RS overhead may not change with an increase of MU-MIMO transmission rank. For example, in maximum, e.g., four rank one users may be served in a MU-MIMO transmission. In another embodiment, a scrambling identity $n_{SCID}$ may be used to support four rank one users with two antenna ports 7 and 8 for DM-RS or UE-RS transmission. For example, four rank one users may use {DM-RS port, $n_{SCID}$} pair, e.g., {7/8, 0/1} to generate one or more DM-RS or UE-RS sequences. In one embodiment, DM-RS or UE-RS with different $n_{SCID}$ may not be orthogonal and eNB may rely on spatial precoding to mitigate an inter-user interference.

In 3GPP LTE Rel-10, a transmission mode 9 (TM 9) may be used to extend the DM-RS or UE-RS structure of TM 8 to support up to rank eight Single-User Multi-Input-Multi-Output (SU-MIMO) transmission. For example, as shown in FIG. 4, a first group of 12 REs, e.g., 410, may be reserved for DM-RS or UE-RS antenna ports {7, 8}. Two DM-RS or UE-RS antenna ports {11, 13} may be added to the same 12 REs of DM-RS or UE-RS ports {7, 8} using length four orthogonal cover code. The first group of 12 REs, e.g., 410, may be used for the four DM-RS or UE-RS ports {7, 8, 11, 13}. As shown in FIG. 4, a second group of 12 REs, e.g., 420 may be reserved for other four DM-RS antenna ports {9, 10, 12, 14}. If the transmission rank is greater than 2, both groups DM-RS ports are used. In another embodiment, for MU-MIMO, TM 9 may keep the same MU-MIMO transmission order as TM 8.

In LTE Rel-11, a transmission mode 10 (TM 10) may be used to keep the same DM-RS structure as TM 9 except that TM 9 may use a physical cell ID to initialize the DM-RS or UE-RS sequence. TM 10 may configure two virtual cell IDs for each UE, e.g., via radio resource control (RRC) signaling. In TM 10, scrambling identity (SCID) signaling in DCI Format 2D may dynamically choose one of the two virtual cell IDs to initialize the DM-RS or UE-RS sequence for a given PDSCH transmission. With the introduction of virtual cell ID, a physical cell may configure its served UEs with maximum 504 different virtual cell IDs. Together with 2 orthogonal DM-RS or UE-RS ports and 2 different SCIDs, a physical cell may configure its served UEs with 2016 unique DM-RS or UE-RS sequences. The number of the DM-RS or UE-RS sequences may be sufficient to support high order MU-MIMO transmission.

In one embodiment, orthogonal structure in MU-MIMO may be extended to a larger number of layers. In some embodiments, two UEs with rank two transmissions or four UEs with rank one transmission may be used for DM-RS or UE-RS enhancements to allow orthogonal DM-RS or UE-RS multiplexing. One example may use, e.g., four orthogonal DM-RS or UE-RS antenna ports with, e.g., 24 REs and orthogonal complimentary code (OCC) of length=2. Another example may use, e.g, four orthogonal DM-RS or UE-RS ports with, e.g., 12 REs and OCC length=4. The two examples may put some restriction in the UE scheduling algorithm. For example, a UE assigned with said antenna ports, e.g., four, may not be paired (co-scheduled) with another UE that may use the same antenna ports. In contrast, for non-orthogonal DM-RS or UE-RS multiplexing with different virtual ID, UEs may be paired in a more flexible manner.

In one embodiment, resource block bundling may be used to improve performance for DM-RS or UE-RS based transmission mode. In 3GPP LTE Rel-10 specification, if a UE is configured with Precoding Matrix Indication (PMI)/Rank Indication (RI) reporting, the UE may assume the same precoding vector over one or more of adjacent RBs. Averaging, e.g., channel estimation, over a larger number of RBs may improve channel estimation performance.

For example, a UE configured for transmission mode 9 for a serving cell may assume that a precoding granularity is multiple resource blocks in the frequency domain if PMI/RI reporting is configured. In another embodiment, for a serving cell, if a UE is configured for transmission mode 10, and if PMI/RI reporting is configured for all configured channel-state information (CSI) processes for the serving cell, the UE may assume that a precoding granularity is multiple resource blocks in the frequency domain. Otherwise, the UE may assume the precoding granularity is one resource block in the frequency domain.

One embodiment may utilize Precoding Resource block Group (PRG) bundling. One or more (e.g., fixed) system bandwidth dependent PRGs of size P' may partition the system bandwidth. Each PRG may consist of one or more consecutive physical resource blocks (PRBs). If $N_{RB}^{DL}$ mod P'>0, one of the PRGs may have a size $N_{RB}^{DL} - P'\lfloor N_{RB}^{DL}/P' \rfloor$, wherein $N_{RB}^{DL}$ may represent a system bandwidth that may correspond to a number of resource blocks in a downlink channel and P' may represent a number of physical resource blocks in a PRG. The PRG size may be non-increasing starting at the lowest frequency, e.g., as shown in Table 1. The UE may assume that the same precoder may apply on all scheduled PRBs within a PRG. In one embodiment, the PRG size a UE may assume for a system bandwidth may be given by Table 1:

TABLE 1

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

As shown in the example of Table 1, a PRG size of 2 RBs for a downlink channel (e.g., a 20 MHz channel) may be used for a system bandwidth of, e.g., 64-100 resource blocks. A smaller PRG size may limit a channel estimation efficiency, e.g., in a frequency flat channel or a channel with a lower frequency selectivity, e.g., in a Full Dimension Multi-Input-Multi-Output (FD-MIMO) antenna configuration that may be used at the eNB for a downlink transmission.

Figure 5:
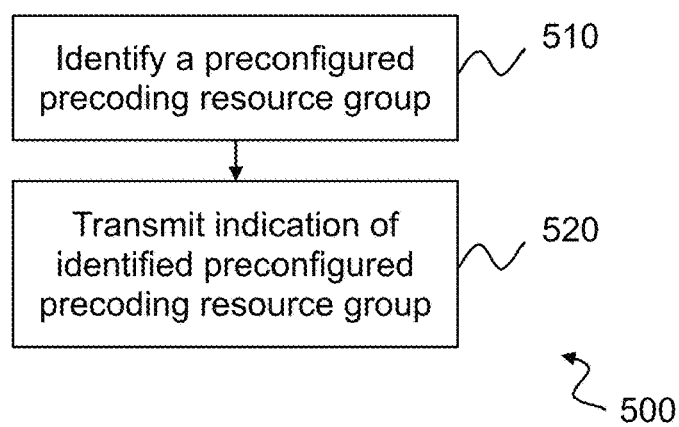
FIG. 5 illustrates a flow chart of a method in accordance with an embodiment.

FIG. 5 illustrates a flowchart of a method 500 for DM-RS or UE-RS enhancement, e.g, for a non-orthogonal DM-RS or UE-RS design. For example, eNB 110 may use different scrambling identities for different users in a MU-MIMO transmission to generate one or more DM-RS or UE-RS sequences that may be non-orthogonal. The eNB 110 may multiplex, e.g. via a multiplexer, the non-orthogonal DM-RS or UE-RS sequences of the UEs. A UE with the non-orthogonal DM-RS sequences may be provided more flexibility in scheduling in MU-MIMO than a UE with orthogonal DM-RS or UE-RS multiplexing. In one embodiment, eNB 110 may perform, via a configuration circuitry or module or unit (not shown) in e.g., controller 114, a configuration of a transmission mode based on DM-RS or UE-RS for, e.g., UE 120. The eNB 110 may perform a configuration of a precoding resource group for UE 120 that may be correspond to the transmission mode and may transmit a dynamic indication relating to the precoding resource group that is used by UE, e.g., as shown in FIG. 5.

In various embodiments, eNB 110 may be configured to perform one or more processes of FIG. 5. For example, the electronic device circuitry of FIG. 9 may be or may be incorporated into or otherwise part of the eNB 110. In one embodiment, eNB 110 may configure, e.g., via a configuration circuitry or module or unit (not shown) in controller 114, a plurality of one or more precoding resource group (PRG) sizes (or one or more corresponding precoding granularities) to generate a precoding granularity configuration for UE 120. In one embodiment, the precoding granularity configuration of UE 120 may comprise a configuration of one or more PRG sizes and/or one or more precoding granularities corresponding to the one or more PRG sizes for a system bandwidth for UE 120. In one embodiment, eNB 110 may preconfigure a plurality of one or more PRGs that may each have a PRG size (or precoding granularity) indicated in the precoding granularity configuration, e.g., via a preconfiguration circuitry or module or unit (not shown) in controller 114. In one embodiment, the configuration circuitry may be coupled with the preconfiguration circuitry.

The eNB 110 may identify, e.g., by the controller 114, a preconfigured PRG relating to the precoding granularity configuration of UE 120 from a plurality of one or more preconfigured PRGs relating to the precoding granularity configuration (510). In 510, controller 114 may identify from the plurality of preconfigured PRGs a preconfigured PRG with a PRG size and/or a precoding granularity corresponding to a PDSCH scheduling. In some embodiments, the controller 114 may comprise an identifying circuitry or module or unit (not shown) to identify the preconfigured PRG. In one embodiment, the configuration circuitry may be coupled to the identifying circuitry.

In one embodiment, eNB 110 may utilize Precoding Resource block Group (PRG) bundling that may, e.g., improve DM-RS or UE-RS based transmission mode. A PRG may consist of one or more consecutive physical resource blocks (PRBs). If $N_{RB}^{DL}$ mod P'>0, one of the PRGs may have a size $N_{RB}^{DL}-P'\lfloor N_{RB}^{DL}/P' \rfloor$, wherein $N_{RB}^{DL}$ may represent a system bandwidth that may correspond to a number of resource blocks in a downlink channel and P' may represent a number of physical resource blocks in a PRG. The UE may assume that the same precoder may apply on all scheduled PRBs within a PRG. In one embodiment, the PRG size a UE may assume for a system bandwidth may be given by Table 2.

For example, eNB 110 may increase a PRG size in an example of FD-MIMO, e.g., as shown in FIG. 2 via RRC signaling. For example, for FD-MIMO, eNB 110 may identify a preconfigured PRG with a PRG size larger than a size in LTE-A release 10 specification based on a PDSCH scheduling (510). In another embodiment, if PDSCH is scheduled by DCI formats 2X, where X=A, B, C and D, eNB 110 may identify a preconfigured PRG with a larger PRG size than a size in a LTE-A release 10 specification (510). In some embodiments, a larger PRG size may provide a better channel estimation performance in, e.g., FD-MIMO, via a higher channel estimation processing gain over a larger number of resource blocks. The precoding resource block size as shown in Table 2 may be used for, e.g., FD-MIMO or other channel with a lower frequency selectivity and/or a PDSCH with a DCI format of, e.g., 2A, 2B, 2C or 2D. In one embodiment, a PRG size may be in accordance with a size of resource block groups (RBG) in a system bandwidth, e.g., as shown in Table 2:

TABLE 2

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 4 |

In one embodiment, to support a fallback operation to a smaller PRG size, the eNB 110 may use a larger PRG size, e.g., as shown in Table 2, only for DCI formats 2A, 2B, 2C and/or 2D that may each schedule a PDSCH transmission. In another embodiment, a legacy PRB bundling, e.g., as shown in Table 1, may be used for DCI Format 1A or 1C that may be used for a PDSCH transmission in Multimedia Broadcast Multicast Service Single Frequency Network (MBSFN) subframes.

In 520, eNB 110 may transmit to the UE, via transmitter 112, an indication for the identified preconfigured PRG, e.g., via DCI signaling (520). In one embodiment, the indication may dynamically indicate the PRG size of the identified preconfigured PRG. In the example of FD-MIMO, the eNB 110 may use the dynamic indication to notify one or more UEs of the increased PRG size for FD-MIMO via DCI signaling (520). In the example of DCI format 2A, 2B, 2C or 2D, transmitter 112 may transmit to UE 120 the dynamic indication that may comprise an indication of the increased PRG size for the identified preconfigured PRG for DCI format 2A, 2B, 2C, or 2D (520). In the example of DCI format 1A or 1C, transmitter 112 may transmit to UE 120 the dynamic indication that may comprise an indication of a PRG size in accordance with LTE-A release 10 specification for DCI format 1A or 1C. In one embodiment, the identifying circuitry may be coupled with the transmitter 112.

Figure 6:
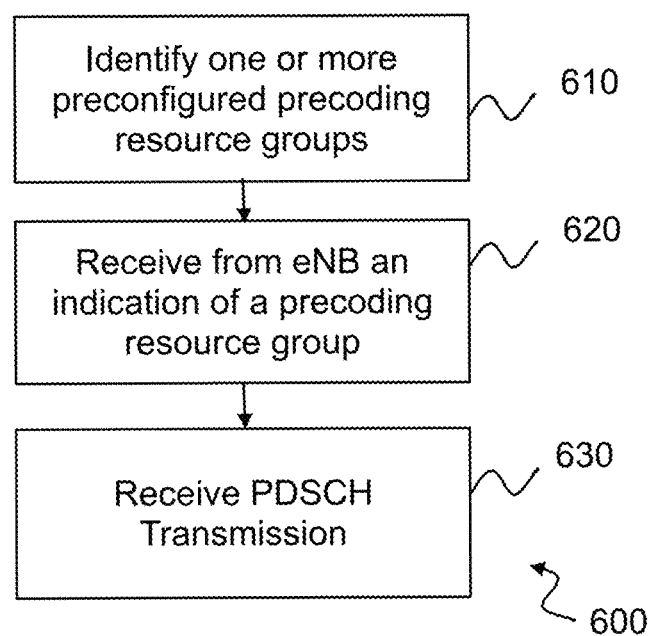
FIG. 6 illustrates a flow chart of a method in accordance with an embodiment.

FIG. 6 illustrates a flowchart of a method 600 for DM-RS or UE-RS enhancement. In one embodiment, the method 600 may be used by a UE 120 of FIG. 1. For example, the electronic device circuitry of FIG. 9 may be or may be incorporated into or otherwise part of UE 120. UE 120 may identify, e.g., by controller 124, a plurality of one or more preconfigured PRGs relating to a precoding granularity configuration of the UE 120 received, by receiver 126 from eNB 110 via higher layer signaling such as RRC (610). In one embodiment, controller 124 may comprise an identifying circuitry or module or unit (now shown) to identify the plurality of preconfigured PRGs that may each have a PRG size and/or a precoding granularity indicated in the precoding granularity configuration. In one embodiment, the identifying circuitry may be coupled with the receiver 122.

UE 120 may further receive from eNB 110 by receiver 126, e.g., via DCI signaling, an indication of a preconfigured PRG that may be identified (e.g., 510) by eNB 110 from the plurality of preconfigured PRGs (620). For example, the indication may dynamically comprise a PRG size of the identified preconfigured PRG. In 630, UE 120 may further receive, by the receiver 126 from eNB 110, a physical downlink shared channel (PDSCH) transmission with the same precoding in the identified preconfigured PRG, wherein the PRG size of the identified preconfigured PRG may be indicated by the dynamic indication. In one embodiment, a precoding granularity corresponding to the PRG size may be the same for the physical resources blocks within the identified preconfigured PRG.

Figure 7:
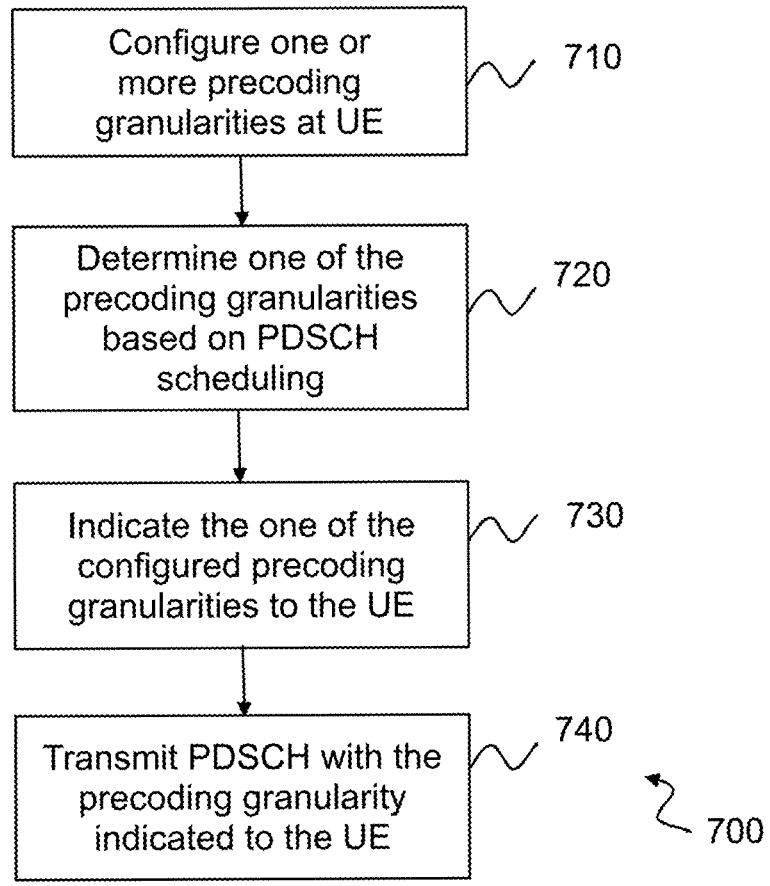
FIG. 7 illustrates a flow chart of a method in accordance with an embodiment.

FIG. 7 illustrates a flowchart of a method 700 for DM-RS or UE-RS enhancements. The method 700 may be used by an eNB 110 of FIG. 1. For example, the electronic device circuitry of FIG. 9 may be or may be incorporated into or otherwise part of the eNB 110. In 710, eNB 110 may configure, e.g., by a configuration circuitry or module or unit (not shown) in controller 112, one or more precoding granularities and/or PRB sizes at UE 120. In some embodiment, eNB 110 may indicate, by transmitter 112 to UE 120, the one or more precoding granularities or corresponding PRG sizes via RRC signaling or other higher layer signaling. In one embodiment, the configuration circuitry may be coupled with the transmitter 112.

In 720, the eNB 110 may determine or identify a precoding granularity and/or a corresponding PRG size based on a PDSCH scheduling. For example, eNB 110 may use a determining or identifying circuitry or module or unit (not shown) in controller 114 for block 720. For example, the eNB 110 may determine a smaller precoding granularity, e.g., a larger PRG size as shown in Table 2, for a PDSCH scheduling corresponding to a transmission for a single user (SU) MIMO. In some embodiment, the determining or identifying circuitry may be coupled with the configuration circuitry and/or the transmitter 112. In some embodiments, SU-MIMO may have a fixed PRB size and block 720 may not be required. In another embodiment, the eNB 110 may determine a larger precoding granularity, e.g., a smaller PRG size as shown in Table 1, for DCI Format 1A or 1C, e.g., for a PDSCH transmission in MBSFN subframes.

In another embodiment, in 720, the determining or identifying circuitry or module or unit may increase a PRG size (i.e., decrease a precoding granularity), e.g., as shown in Table 2, based on a number of resource block groups (RBGs) in a system bandwidth of a MU-MIMO or based on a sub-band size used for precoding matrix indicator (PMI) reporting from UE 120. In some embodiments, a number of physical resource blocks in a PRG may be identical to or be a multiple of a number of resource block groups in a system bandwidth. In some embodiments, a number of physical resource blocks in a precoding resource group may be equal to or be multiple of a sub-band size of a precoding matrix indicator (PMI) report.

In 730, the eNB 110 may indicate, e.g., by transmitter 112, to UE 120 one of the configured precoding granularities or PRG size that is determined in 720, e.g., via DCI signaling. In 740, the eNB 740 may transmit PDSCH with the precoding granularity indicated to the UE 110.

Figure 9:
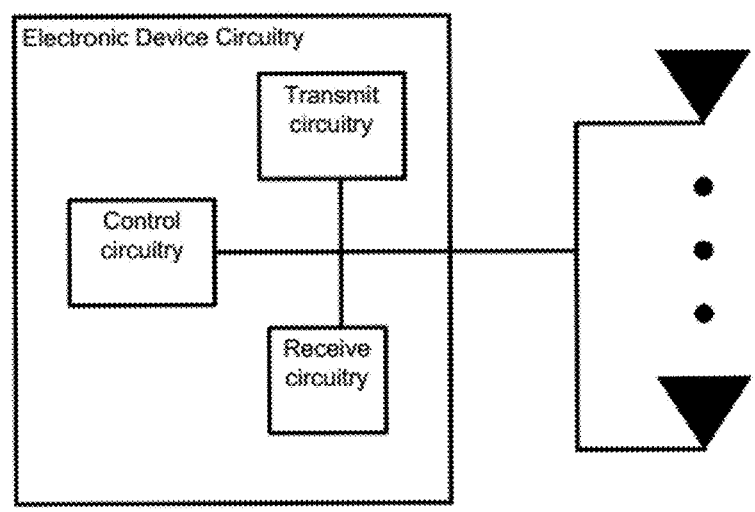
FIG. 9 illustrates an electronic device circuitry according to an embodiment.
Figure 10:
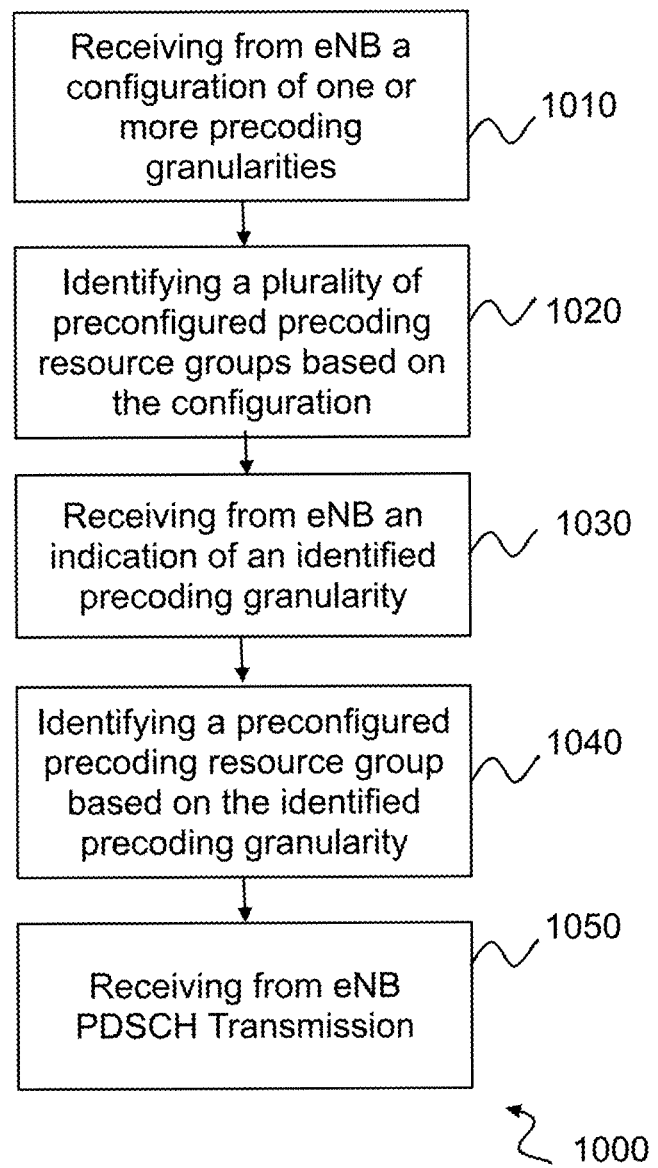
FIG. 10 illustrates a flow chart of a method in accordance with an embodiment.

FIG. 10 illustrates a flowchart of a method 1000 for DM-RS or UE-RS enhancements. In one embodiment, the method 1000 may be used by UE 120. For example, the electronic device circuitry of FIG. 9 may be or may be incorporated into or otherwise part of UE 120. In 1010, UE 120 may receive, by receiver 126 from eNB 110, a precoding granularity configuration for UE 120, e.g., via RRC signaling. The precoding granularity configuration may comprise PRG sizes (or one or more precoding granularities) that may each correspond to a preconfigured PRG for a given system bandwidth for UE 120. In 1020, UE 120 may identify a plurality of one or more preconfigured PRGs based on the precoding granularity configuration by controller 124, e.g., an identifying circuitry or module or unit in controller 124 (not shown). In one embodiment, the identifying circuitry may be coupled with the receiver 126.

In 1030, UE 120 may further receive, by receiver 126 from eNB 110, a dynamic indication of an identified precoding granularity (or an identified PRG size), e.g., via DCI signaling. In one embodiment, eNB 110 may determine the identified precoding granularity (or the identified PRG size) from the plurality of precoding granularities, e.g., based on a PDSCH scheduling (720). In 1040, UE 120 may identify a preconfigured PRG from the plurality of preconfigured PRGs based on the identified precoding granularity and/or PRG size, e.g., by a corresponding identifying circuitry or module or unit (not shown) in controller 124. In one embodiment, the corresponding identifying circuitry may be coupled with the receiver 126. In some embodiments, blocks 1020 and/or 1040 may be performed by the same identifying circuitry. For example, UE 120 may group one or more physical resource blocks to form the preconfigured PRG based on the identified precoding granularity or PRG size. In 1050, UE 120, e.g., receiver 126, may receive from eNB 110 a PDSCH transmission with a precoding that is the same for one or more physical resource blocks in the preconfigured PRG as identified in 1040.

Figure 8:
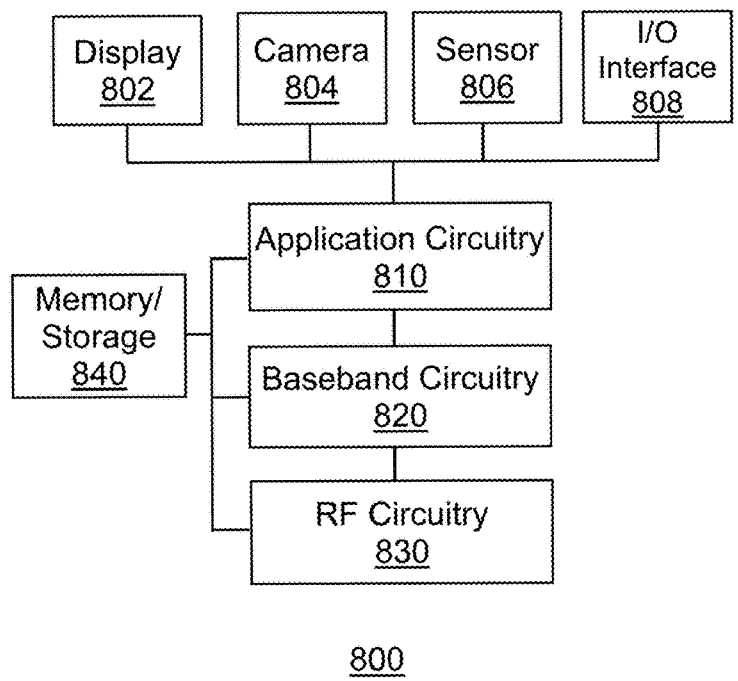
FIG. 8 illustrates an example of a block diagram of a mobile communication device in accordance with an embodiment.

Embodiments described herein may be implemented into a system using any suitably configured hardware, software and/or firmware. FIG. 8 illustrates, for one embodiment, an example system comprising radio frequency (RF) circuitry 830, baseband circuitry 820, application circuitry 810, memory/storage 840, display 802, camera 804, sensor 806, and input/output (I/O) interface 808, coupled with each other at least as shown.

The application circuitry 810 may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry 820 may include circuitry such as, but not limited to, one or more single-core or multi-core processors. The processor(s) may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, baseband circuitry 820 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

RF circuitry 830 may enable communication with wireless networks using modulated electromagnetic radiation through a non-solid medium. In various embodiments, the RF circuitry 830 may include switches, filters, amplifiers, etc. to facilitate the communication with the wireless network. In various embodiments, RF circuitry 830 may include circuitry to operate with signals that are not limited to a radio frequency. For example, in some embodiments, RF circuitry 830 may include circuitry to operate with signals having an intermediate frequency, which is between a baseband frequency and a radio frequency.

In various embodiments, transmit circuitry, control circuitry, and/or receive circuitry discussed or described herein may be embodied in whole or in part in one or more of the RF circuitry 830, the baseband circuitry 820, and/or the application circuitry 810. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules or units.

In some embodiments, some or all of the constituent components of the baseband circuitry 820, the application circuitry 810, and/or the memory/storage may be implemented together on a system on a chip (SOC).

Memory/storage 840 may be used to load and store data and/or instructions, for example, for system. Memory/storage 840 for one embodiment may include any combination of suitable volatile memory (e.g., dynamic random access memory (DRAM)) and/or non-volatile memory (e.g., Flash memory).

In various embodiments, the I/O interface 808 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 802 may include a display (e.g., a liquid crystal display, a touch screen display, etc.).

In various embodiments, the system may be a mobile computing device such as, but not limited to, a laptop computing device, a tablet computing device, a netbook, an ultrabook, a smartphone, etc. In various embodiments, system may have more or less components, and/or different architectures.

FIG. 9 illustrates electronic device circuitry according to an embodiment. The electronic device circuitry may be eNB circuitry, UE circuitry, or some other type of circuitry in accordance with various embodiments. In embodiments, the electronic device circuitry may be, or may be incorporated into or otherwise a part of, an eNB, a UE, or some other type of electronic device. The electronic device circuitry may include radio transmit circuitry and receive circuitry coupled to control circuitry. In embodiments, the transmit and/or receive circuitry may be elements or modules or units of transceiver circuitry, as shown. The electronic device circuitry may be coupled with one or more plurality of antenna elements of one or more antennas. The electronic device circuitry and/or the components of the electronic device circuitry may be configured to perform operations similar to those described herein.

In embodiments where the electronic device circuitry is or is incorporated into or otherwise part of an eNB, the control circuitry may be to identify a preconfigured precoding resource group relating to a precoding granularity configuration of a UE from a plurality of one or more preconfigured PRGs related to the precoding granularity configuration of the UE, wherein the plurality of one or more preconfigured PRGs are configured based on one or more higher level signals. The transmit circuitry may be to transmit, to the UE, a dynamic indication of the identified preconfigured PRG.

In embodiments where the electronic device circuitry is or is incorporated into or otherwise part of the UE, the control circuitry may identify, based on higher layer signaling, a plurality of one or more preconfigured PRGs relating to a precoding granularity configuration of the UE, wherein the preconfigured PRGs may be preconfigured based on higher layer signaling, e.g., RRC signaling, from an eNB. The receive circuitry may receive, from an eNB, a dynamic indication of a precoding resource group from the plurality of precoding resource groups. The receive circuitry may be further to receive a physical downlink shared channel (PDSCH) transmission with a precoding that may be the same for one or more physical resource blocks in the precoding resource group, wherein the precoding resource group may have a PRG size indicated in the dynamic indication.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules or units.

In embodiments the electronic device circuitry of FIG. 9 may be configured to perform one or more processes such as the process of FIGS. 4-7. For example, if the electronic device circuitry of FIG. 9 is or is incorporated into or otherwise part of an eNB, the process may include identifying a preconfigured precoding resource group related to a precoding granularity configuration of a user equipment (UE) from a plurality of one or more preconfigured PRGs related to the precoding granularity configuration of the UE. The process may further include transmitting, to the UE, a dynamic indication of the identified preconfigured PRG.

Examples

Example 1 may include a method of precoding granularity configuration and signaling in LTE-A, the method comprising: higher layer configuration of user equipment (UE) with transmission mode based on user equipment specific reference signals (UE-RS); higher layer configuration of a precoding resource group; and dynamic indication relating to the precoding resource group that is used by UE.

Example 2 may include the method of example 1 or some other example(s) herein, wherein at least one higher layer configured precoding group is in accordance to the size of LTE-A Release 10 specification.

Example 3 may include the method of example 1 or some other example(s) herein, wherein at least higher layer configured precoding groups has a larger number of resource blocks (RB) in the configured precoding group than in LTE-A Release 10 specification.

Example 4 may include the method of example 1 or some other example(s) herein, wherein the dynamic indication includes an indication related to which precoding resource group size N among higher layer configured is valid for a physical downlink shared channel (PDSCH).

Example 5 may include the method of example 4 or some other example(s) herein, wherein the same precoding and/or power assignment is used over the N adjacent RBs.

Example 6 may include the method of example 5 or some other example(s) herein, wherein dynamic indication is downlink control based information (DCI) using at least one of DCI Format 2A, 2B, 2C or 2D.

Example 7 may include the method of example 1 or some other example(s) herein, wherein the precoding granularity is in accordance to the size of LTE-A Release 10 specification, where PDSCH is scheduled with DCI Format 1A or 1C.

Example 8 may include a method comprising: identifying, by an evolved NodeB (eNB), a preconfigured precoding resource group related to a precoding granularity configuration of a user equipment (UE) from a plurality of one or more preconfigured precoding resource groups related to the precoding granularity configuration of the UE; and transmitting, by the eNB to the UE, a dynamic indication for the identified preconfigured precoding resource group.

Example 9 may include the method of example 8 or some other example(s) herein, wherein at least one of the preconfigured precoding resource groups has a number of resource blocks (RBs) that is in accordance with Release 10 of long term evolution-advanced (LTE-A) specifications.

Example 10 may include the method of example 8 or some other example(s) herein, wherein at least one of the preconfigured precoding resource groups has a number of resource blocks (RBs) that is larger than a number of RBs that is in accordance with Release 10 of long term evolution-advanced (LTE-A) specifications.

Example 11 may include the method of example 8 or some other example(s) herein, wherein the dynamic indication may include an indication related to which precoding resource group having a size N among the preconfigured precoding resource groups is currently valid for physical downlink shared channel (PDSCH).

Example 12 may include the method of example 11 or some other example(s) herein, wherein a same precoding and power assignment is used over N adjacent RBs of the precoding resource group having a size N.

Example 13 may include the method of example 12 or some other example(s) herein, wherein the dynamic indication is a downlink control information (DCI) using at least one of DCI Format 2A, 2B, 2C or 2D.

Example 14 may include the method of example 8 or some other example(s) herein, wherein the precoding granularity is in accordance with a long term evolution-advanced (LTE-A) Release 10 specification, and wherein a physical downlink shared channel (PDSCH) transmission is scheduled with downlink control information (DCI) Format 1A or 1C.

Example 15 may include the method of example 8 or some other example(s) herein, wherein the preconfigured precoding resource groups are preconfigured by a higher layer.

Example 16 may include an evolved NodeB (eNB) comprising: control circuitry to identify a preconfigured precoding resource group related to a precoding granularity configuration of a user equipment (UE) from a plurality of one or more preconfigured precoding resource groups related to the precoding granularity configuration of the UE, wherein the plurality of preconfigured precoding resource groups are configured based on one or more higher level signals; and transmit circuitry coupled with the control circuitry, the transmit circuitry to transmit, to the UE, a dynamic indication for the identified preconfigured precoding resource group.

Example 17 may include the eNB of example 16 or some other example(s) herein, wherein at least one of the preconfigured precoding resource groups has a number of resource blocks (RBs) that is in accordance with Release 10 of long term evolution-advanced (LTE-A) specifications.

Example 18 may include the eNB of example 16 or some other example(s) herein, wherein at least one of the preconfigured precoding resource groups has a number of resource blocks (RBs) that is larger than a number of RBs that is in accordance with Release 10 of long term evolution-advanced (LTE-A) specifications.

Example 19 may include the eNB of example 16 or some other example(s) herein, wherein the dynamic indication includes an indication related to which precoding resource group having a size N among the preconfigured precoding resource groups is currently valid for physical downlink shared channel (PDSCH).

Example 20 may include the eNB of example 19 or some other example(s) herein, wherein a same precoding and power assignment is used over N adjacent RBs of the precoding resource group having a size N.

Example 21 may include the eNB of example 20 or some other example(s) herein, wherein the dynamic indication is a downlink control information (DCI) using at least one of DCI Format 2A, 2B, 2C or 2D.

Example 22 may include the eNB of example 16 or some other example(s) herein, wherein the precoding granularity is in accordance with a long term evolution-advanced (LTE-A) Release 10 specification, and wherein a physical downlink shared channel (PDSCH) transmission is scheduled with downlink control information (DCI) Format 1A or 1C.

Example 23 may include a method comprising: identifying, by a user equipment (UE) based on higher layer signaling, a plurality of one or more preconfigured precoding resource groups related to a precoding granularity configuration of the UE; receiving, by the UE from an eNB, a dynamic indication for a precoding resource group from the plurality of precoding resource groups; and receiving, by the UE, a physical downlink shared channel (PDSCH) transmission using a precoding that is the same for one or more physical resource blocks in the precoding resource group, wherein the precoding resource group size may be dynamically indicated by the dynamic indication.

Example 24 may include the method of example 23 or some other example(s) herein, wherein at least one of the preconfigured precoding resource groups has a number of resource blocks (RBs) that is in accordance with Release 10 of long term evolution-advanced (LTE-A) specifications.

Example 25 may include the method of example 23 or some other example(s) herein, wherein at least one of the preconfigured precoding resource groups has a number of resource blocks (RBs) that is larger than a number of RBs that is in accordance with Release 10 of long term evolution-advanced (LTE-A) specifications.

Example 26 may include the method of example 23 or some other example(s) herein, wherein the dynamic indication includes an indication related to which precoding resource group having a size N among the preconfigured precoding resource groups is currently valid for PDSCH.

Example 27 may include the method of example 26 or some other example(s) herein, wherein a same precoding and power assignment is used over N adjacent RBs of the precoding resource group having a size N.

Example 28 may include the method of example 27 or some other example(s) herein, wherein the dynamic indication is a downlink control information (DCI) using at least one of DCI Format 2A, 2B, 2C or 2D.

Example 29 may include the method of example 23 or some other example(s) herein, wherein the precoding granularity is in accordance with a long term evolution-advanced (LTE-A) Release 10 specification, and wherein the PDSCH transmission is scheduled with downlink control information (DCI) Format 1A or 1C.

Example 30 may include the method of example 23 or some other example(s) herein, wherein the preconfigured precoding resource groups are preconfigured by a higher layer.

Example 31 may include a user equipment (UE) comprising: control circuitry to identify, based on higher layer signaling, a plurality of one or more preconfigured precoding resource groups related to a precoding granularity configuration of the UE, wherein the preconfigured precoding resource groups are preconfigured based on one or more higher layer signals; and receive circuitry coupled with the control circuitry, the receive circuitry to receive, from an eNB, a dynamic indication for a precoding resource group from the plurality of preconfigured precoding resource groups; and receive a physical downlink shared channel (PDSCH) transmission with a precoding that is the same for one or more physical resource blocks in the precoding resource group.

Example 32 may include the UE of example 31 or some other example(s) herein, wherein at least one of the preconfigured precoding resource groups has a number of resource blocks (RBs) that is in accordance with Release 10 of long term evolution-advanced (LTE-A) specifications.

Example 33 may include the UE of example 31 or some other example(s) herein, wherein at least one of the preconfigured precoding resource groups has a number of resource blocks (RBs) that is larger than a number of RBs that is in accordance with Release 10 of long term evolution-advanced (LTE-A) specifications.

Example 34 may include the UE of example 31 or some other example(s) herein, wherein the dynamic indication includes an indication related to which precoding resource group having a size N among the preconfigured precoding resource groups is currently valid for PDSCH.

Example 35 may include the UE of example 34 or some other example(s) herein, wherein a same precoding and power assignment is used over N adjacent RBs of the precoding resource group having a size N.

Example 36 may include the UE of example 35 or some other example(s) herein, wherein the dynamic indication is a downlink control information (DCI) using at least one of DCI Format 2A, 2B, 2C or 2D.

Example 37 may include the UE of example 31 or some other example(s) herein, wherein the precoding granularity is in accordance with a long term evolution-advanced (LTE-A) Release 10 specification, and wherein the PDSCH transmission is scheduled with downlink control information (DCI) Format 1A.

Example of 38 may comprise a method, comprising: configuring a transmission mode for a user equipment (UE) based on user equipment specific reference signals (UE-RS); configuring at least one precoding resource group; and providing a dynamic indication to indicate which precoding resource group is used.

Example 39 may include the method of example 38 or some other example(s) herein, wherein at least one precoding resource group is in accordance with a size in LTE-A Release 10 specification.

Example 40 may include the method of example 38 or some other example(s) herein, wherein the at least one precoding resource group has a larger number of physical resource blocks (PRB) than in LTE-A Release 10 specification.

Example 41 may include the method of example 38 or some other example(s) herein, wherein the at least one precoding resource group has a size that is equal to or a multiple of a size of resource block group (RBG) of a system bandwidth.

Example 42 may include the method of example 38 or some other example(s) herein, wherein the precoding resource group is equal to or a multiple of a sub-band size of a precoding matrix indicator (PMI) report.

Example 43 may include the method of example 38 or some other example(s) herein, wherein the precoding resource group indicated by the dynamic indication is used to transmit physical downlink shared channel (PDSCH).

Example 44 may include the method of example 38 or some other example(s) herein, wherein the same precoding and/or power assignment is used over one or more adjacent RBs of the precoding resource group indicated by the dynamic indication.

Example 45 may include the method of example 38 or some other example(s) herein, wherein the dynamic indication is for a downlink control based information (DCI) using at least one of DCI Format 2A, 2B, 2C or 2D.

Example 46 may include the method of example 43 or some other example(s) herein, wherein the precoding granularity is in accordance with the size of LTE-A Release 10 specification for PDSCH scheduled with DCI Format 1A or 1C.

Example 47 may comprise a method, comprising: identifying, by an evolved NodeB (eNB), a preconfigured precoding resource group related to a precoding granularity configuration of a user equipment (UE) from a plurality of one or more preconfigured precoding resource groups related to the precoding granularity configuration of the UE; and transmitting, by the eNB to the UE, a dynamic indication of the identified preconfigured precoding resource group.

Example 48 may include the method of example 47 or some other example(s) herein, wherein at least one of the plurality of preconfigured precoding resource groups has a number of resource blocks (RBs) that is larger than a number of RBs that is in accordance with Release 10 of long term evolution-advanced (LTE-A) specifications.

Example 49 may include the method of example 47 or some other example(s) herein, wherein a same precoding and power assignment is used over one or more adjacent RBs of the identified precoding resource group.

Example 50 may include the method of example 47 or some other example(s) herein, wherein the dynamic indication is to indicate that the identified precoding resource group is used on physical downlink shared channel (PDSCH).

Example 51 may include the method of example 47 or some other example(s) herein, wherein the identified precoding resource group has one or more adjacent RBs and wherein a number of the adjacent RBs is determined based on a bandwidth of the PDSCH.

Example 52 may comprise an evolved NodeB (eNB), comprising: control circuitry to identify a preconfigured precoding resource group related to a precoding granularity configuration of a user equipment (UE) from a plurality of one or more preconfigured precoding resource groups related to the precoding granularity configuration of the UE, wherein the plurality of preconfigured precoding resource groups are configured based on one or more higher level signals; and transmit circuitry coupled with the control circuitry, the transmit circuitry to transmit, to the UE, a dynamic indication of the identified preconfigured precoding resource group.

Example 53 may include the eNB of example 52 or some other example(s) herein, wherein at least one of the preconfigured precoding resource groups has a number of resource blocks (RBs) that is in accordance with Release 10 of long term evolution-advanced (LTE-A) specifications.

Example 54 may include the eNB of example 52 or some other example(s) herein, wherein at least one of the preconfigured precoding resource groups has a number of resource blocks (RBs) that is larger than a number of RBs that is in accordance with Release 10 of long term evolution-advanced (LTE-A) specifications.

Example 55 may include the eNB of example 52 or some other example(s) herein, wherein the dynamic indication includes an indication related to the identified preconfigured precoding resource group that is used to transmit physical downlink shared channel (PDSCH).

Example 56 may include the eNB of example 52 or some other example(s) herein, wherein a same precoding and power assignment is used over N adjacent RBs of the identified precoding resource group, wherein N represents a number of physical recourse blocks in the identified precoding resource group.

Example 57 may include the eNB of example 52 or some other example(s) herein, wherein the dynamic indication is a downlink control information (DCI) using at least one of DCI Format 2A, 2B, 2C or 2D.

Example 58 may include the eNB of example 52 or some other example(s) herein, wherein the precoding granularity is in accordance with a long term evolution-advanced (LTE-A) Release 10 specification, and wherein a physical downlink shared channel (PDSCH) transmission is scheduled with downlink control information (DCI) Format 1A or 1C.

Example 59 may comprise a non-transitory machine-readable medium having instructions, stored thereon, that, when executed cause a user equipment to: identify a plurality of one or more preconfigured precoding resource groups related to a precoding granularity configuration of the UE based on higher layer signaling; receive a dynamic indication for a precoding resource group from the plurality of precoding resource groups; and receive a physical downlink shared channel (PDSCH) transmission with a precoding that is the same for one or more physical resource blocks in the precoding resource group, the precoding resource group to have a precoding size indicated in the dynamic indication.

Example 60 may include the non-transitory machine-readable medium of example 59 or some other example(s) herein, wherein at least one of the preconfigured precoding resource groups has a number of resource blocks (RBs) that is in accordance with Release 10 of long term evolution-advanced (LTE-A) specifications.

Example 61 may include the non-transitory machine-readable medium of example 59 or some other example(s) herein, wherein at least one of the preconfigured precoding resource groups has a number of resource blocks (RBs) that is larger than a number of RBs that is in accordance with Release 10 of long term evolution-advanced (LTE-A) specifications.

Example 62 may include the non-transitory machine-readable medium of example 59 or some other example(s) herein, wherein the dynamic indication is for a downlink control information (DCI) using at least one of DCI Format 2A, 2B, 2C or 2D.

Example 63 may include the non-transitory machine-readable medium of example 59 or some other example(s) herein, wherein the precoding granularity is in accordance with a long term evolution-advanced (LTE-A) Release 10 specification, and wherein the PDSCH transmission is scheduled with downlink control information (DCI) Format 1A or 1C.

Example 64 may comprise a user equipment (UE), comprising: receive circuitry to receive, from an eNB, a configuration of a set of one or more precoding granularities and an indication of a precoding granularity from the set of one or more precoding granularities; and control circuitry coupled with the receive circuitry, the control circuitry to identify a set of one or more precoding resource groups based on the configuration of set of one or more precoding granularities, and to identify a precoding resource group from the set of one or more precoding resource groups based on the indication of the precoding granularity.

Example 65 may include the UE of example 64 or some other example(s) herein, wherein the receive circuitry further to receive a PDSCH from the eNB with a precoding that is the same for one or more physical resource blocks in the precoding resource group identified from the set of one or more precoding resource groups.

Example 66 may include the UE of example 64 or some other example(s) herein, wherein the control circuitry further to group a set of one or more physical resource blocks based on the indication of the precoding granularity to form the precoding resource group.

Example 67 may include the UE of example 64 or some other example(s) herein, wherein the control circuitry further to identify the precoding resource group to have a larger number of physical resource blocks than in LTE-A Release 10 specification based on the indication of the precoding granularity.

Example 68 may include the UE of example 64 or some other example(s) herein, wherein the control circuitry is further to identify the precoding resource group to have a size identical to or be a multiple of a sub-band size of a precoding matrix indicator (PMI) report of the UE.

Example 69 may include the UE of example 64 or some other example(s) herein, wherein the control circuitry is further to identify the precoding resource group for a downlink control based information (DCI) using at least one of DCI Format 2A, 2B, 2C or 2D.

Example 70 may include the UE of example 64 or some other example(s) herein, wherein the precoding granularity is in accordance with a long term evolution-advanced (LTE-A) Release 10 specification for PDSCH scheduled with DCI Format 1A or 1C Example 71 may include an apparatus comprising means to perform one or more elements of a method described in or related to any of examples 1-15, 23-30, 38-51 and/or any other method or process described herein.

Example 72 may include one or more non-transitory computer-readable media comprising instructions to cause an electronic device, upon execution of the instructions by one or more processors of the electronic device, to perform one or more elements of a method described in or related to any of examples 1-15, 23-30, 38-51 and/or any other method or process described herein.

Example 73 may include an apparatus comprising control circuitry, transmit circuitry, and/or receive circuitry to perform one or more elements of a method described in or related to any of examples 1-15, 23-30, 38-51 and/or any other method or process described herein.

Example 74 may include a method of communicating in a wireless network as shown and described herein.

Example 75 may include a system for providing wireless communication as shown and described herein.

Example 76 may include a device for providing wireless communication as shown and described herein.

It should be understood that many of the functional units described in this specification have been labeled as modules or units, in order to more particularly emphasize their implementation independence. For example, a module or unit may be implemented as a hardware circuit comprising custom VLSI circuits or gate arrays, off-the-shelf semiconductors such as logic chips, transistors, or other discrete components. A module or unit may also be implemented in programmable hardware devices such as field programmable gate arrays, programmable array logic, programmable logic devices or the like.

Modules or units may also be implemented in software for execution by various types of processors. An identified module or unit of executable code may, for instance, comprise one or more physical or logical blocks of computer instructions, which may, for instance, be organized as an object, procedure, or function. Nevertheless, the executable code of an identified module or unit need not be physically located together, but may comprise disparate instructions stored in different locations which, when joined logically together, comprise the module or unit and achieve the stated purpose for the module or unit.

A module or unit of executable code may be a single instruction, or many instructions, and may even be distributed over several different code segments, among different programs, and across several memory devices. Similarly, operational data may be identified and illustrated herein within modules or units, and may be embodied in any suitable form and organized within any suitable type of data structure. The operational data may be collected as a single data set, or may be distributed over different locations including over different storage devices, and may exist, at least partially, merely as electronic signals on a system or network. The modules or units may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as an equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as equivalents of one another, but are to be considered as separate and autonomous representations of the present invention.

Furthermore, the described features, structures, or characteristics may be combined in any suitable manner in one or more embodiments. In the following description, numerous specific details are provided, such as examples of search spaces, to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

While the methods of FIGS. 1, 2, 7 and 8 is illustrated to comprise a sequence of processes, the methods in some embodiments may perform illustrated processes in a different order.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. One or more non-transitory, machine-readable media having instructions that, when executed by one or more processors, cause an evolved node B ("eNB") to:
    configure a plurality of precoding granularities at a user equipment ("UE");
    determine a precoding granularity from the plurality of precoding granularities based on one or more parameters of a physical downlink shared channel ("PDSCH") scheduling decision;
    transmit an indication of the precoding granularity to the UE; and
    transmit a PDSCH using the precoding granularity,
    wherein to determine the precoding granularity is to determine one of:
        a larger precoding granularity, corresponding to a smaller precoding resource block group (PRG) size, for a downlink control information (DCI) format 1A or 1C transmission; or
        a smaller precoding granularity, corresponding to a larger PRG size, for PDSCH scheduling corresponding to a transmission for a single user (SU) or full dimension (FD) multiple input multiple output (MIMO).

2. The one or more non-transitory, machine-readable media of claim 1, wherein the instructions, when executed, further cause the eNB to: transmit the indication using downlink control information signaling.

3. The one or more non-transitory, machine-readable media of claim 1, wherein the instructions, when executed, further cause the eNB to:

configure the plurality of precoding granularities using radio resource control signaling.

4. The one or more non-transitory, machine-readable media of claim 1, wherein the precoding granularity is a first precoding granularity and, for a system bandwidth that includes 64-110 resource blocks in a downlink channel, the first precoding granularity is to provide a precoding resource block group ("PRG") of four physical resource blocks and a second precoding granularity of the plurality of precoding granularities is to provide a PRG of two physical resource blocks.

5. The one or more non-transitory, machine-readable media of claim 4, wherein the PDSCH scheduling is a first PDSCH scheduling; the indication is a first indication;
the PDSCH is a first PDSCH; and the instructions, when executed, further cause the eNB to:
determine the second precoding granularity based on a second PDSCH scheduling;
transmit a second indication of the second precoding granularity to the UE; and
transmit a second PDSCH using the second precoding granularity.

6. The one or more non-transitory, machine-readable media of claim 1, wherein to determine the precoding granularity based on the PDSCH scheduling, the eNB is to:
determine that downlink control information ("DCI") format 2A, 2B, 2C, or 2D is to schedule the PDSCH; and
determine the precoding granularity based on the determination that DCI format 2A, 2B, 2C, or 2D is to schedule the PDSCH.

7. An evolved node B ("eNB") comprising:
control circuitry to:
generate a radio resource control ("RRC") message that includes configuration information to configure a plurality of precoding granularities at a user equipment ("UE");
determine a precoding granularity from the plurality of precoding granularities based on one or more parameters of a physical downlink shared channel ("PDSCH") scheduling decision;
generate downlink control information ("DCI") to include an indication of the precoding granularity; and
generate a PDSCH using the precoding granularity; and
transmit circuitry, coupled with the control circuitry, to transmit the RRC message, DCI, and PDSCH to the UE, wherein to determine the precoding granularity is to determine one of:
a larger precoding granularity, corresponding to a smaller precoding resource block group (PRG) size, for a downlink control information (DCI) format PDSCH 1A or 1C transmission; or
a smaller precoding granularity, corresponding to a larger PRG size, for PDSCH scheduling corresponding to a transmission for a single user (SU) or full dimension (FD) multiple input multiple output (MIMO).

8. The eNB claim 7, wherein the precoding granularity is a first precoding granularity and, for a system bandwidth that includes 64-110 resource blocks in a downlink channel, the first precoding granularity is to provide a precoding resource block group ("PRG") of four physical resource blocks and a second precoding granularity of the plurality of precoding granularities is to provide a PRG of two physical resource blocks.

9. The eNB of claim 8, wherein the PDSCH scheduling is a first PDSCH scheduling; the indication is a first indication; the PDSCH is a first PDSCH; and the control circuitry is further to:
determine the second precoding granularity based on a second PDSCH scheduling;
generate second DCI to include a second indication of the second precoding granularity to the UE; and
generate a second PDSCH using the second precoding granularity.

10. The eNB of claim 7, wherein to determine the precoding granularity based on the PDSCH scheduling the eNB is to:
determine that downlink control information ("DCI") format 2A, 2B, 2C, or 2D is to schedule the PDSCH; and
determine the precoding granularity based on the determination that DCI format 2A, 2B, 2C, or 2D is to schedule the PDSCH.

11. The one or more non-transitory, machine-readable media of claim 1, wherein the instructions, when executed, further cause the eNB to: determine a
corresponding PRG size to the precoding granularity based on the one or more parameters of the PDSCH scheduling decision.

12. The one or more non-transitory, machine-readable media of claim 1, wherein the instructions, when executed, further cause the eNB to determine a smaller precoding granularity for a PDSCH scheduling for DCI formats 2A, 2B, 2C or 2D.

13. The one or more non-transitory, machine-readable media of claim 1, wherein the instructions, when executed, further cause the eNB to determine a larger precoding granularity for a PDSCH transmission in multimedia broadcast single frequency network (MBSFN) subframes.

14. The eNB of claim 7, wherein the control circuitry is further to determine a corresponding PRG size to the precoding granularity based on the one or more parameters of the PDSCH scheduling decision.

15. The eNB of claim 7, wherein the control circuitry is further to determine a smaller precoding granularity for a PDSCH scheduling for DCI formats 2A, 2B, 2C or 2D.

16. The eNB of claim 7, wherein the control circuitry is further to determine a larger precoding granularity for a PDSCH transmission in MBSFN subframes.

* * * * *